United States Patent [19]

Thomas

[11] Patent Number: 4,853,680

[45] Date of Patent: Aug. 1, 1989

[54] GROOVE CUTTING TOOL BREAK EVENT DETECTING METHOD AND SYSTEM

[75] Inventor: Charles E. Thomas, Scotia, N.Y.

[73] Assignee: General Electric Company, Schenectady, N.Y.

[21] Appl. No.: 142,979

[22] Filed: Jan. 12, 1988

[51] Int. Cl.$^4$ .......................................... G08B 21/00
[52] U.S. Cl. .................... 340/680; 340/683; 73/104; 73/660
[58] Field of Search .................. 340/680, 683; 73/104, 73/660; 364/507, 508, 550, 551, 474, 475

[56] References Cited

U.S. PATENT DOCUMENTS

| | | | |
|---|---|---|---|
| 4,207,567 | 6/1980 | Juengel et al. | 340/680 |
| 4,326,257 | 4/1982 | Sata et al. | 364/508 |
| 4,437,163 | 3/1984 | Kurihara et al. | 364/508 |
| 4,632,683 | 12/1986 | Thomas et al. | 364/474 |
| 4,636,779 | 1/1987 | Thomas et al. | 340/680 |
| 4,636,780 | 1/1987 | Thomas et al. | 340/680 |
| 4,642,617 | 2/1987 | Thomas et al. | 340/680 |
| 4,642,618 | 2/1987 | Johnson et al. | 340/683 |
| 4,704,693 | 11/1987 | Thomas | 364/508 |
| 4,707,687 | 11/1987 | Thomas et al. | 340/680 |
| 4,707,688 | 11/1987 | Thomas | 340/680 |
| 4,709,198 | 11/1987 | Ogo et al. | 318/571 |

OTHER PUBLICATIONS

"Automatic Tool Touch and Breakage Detection in Turning", S. R. Hayashi et al, General Electric Company, Technical Information Series, No. 85 CRD 097, pp. 1-11 (Jun. 1985).

Primary Examiner—Joseph A. Orsino
Assistant Examiner—Jeffery A. Hofsass
Attorney, Agent, or Firm—Donald R. Campbell; James C. Davis, Jr.; Paul R. Webb, II

[57] ABSTRACT

Vibrations at the groove cutting tool-workpiece interface are sensed by a vibration sensor such as, for example, an accelerometer, and the vibration sensor output is processed to yield an electrical signal indicative of groove cutting tool cutting noise vibration. Digital analysis of the electrical signal after it is sampled is performed to detect various types of groove cutting tool break event signatures, and especially a type of signature in which a high amplitude positive going spike is followed by a significant shift in the mean amplitude signal level of the background cutting vibration. A machine tool monitor, system and method are disclsoed which detects such changes and interprets them to detect groove tool break events of sufficient magnitude to endanger the machined part.

2 Claims, 8 Drawing Sheets

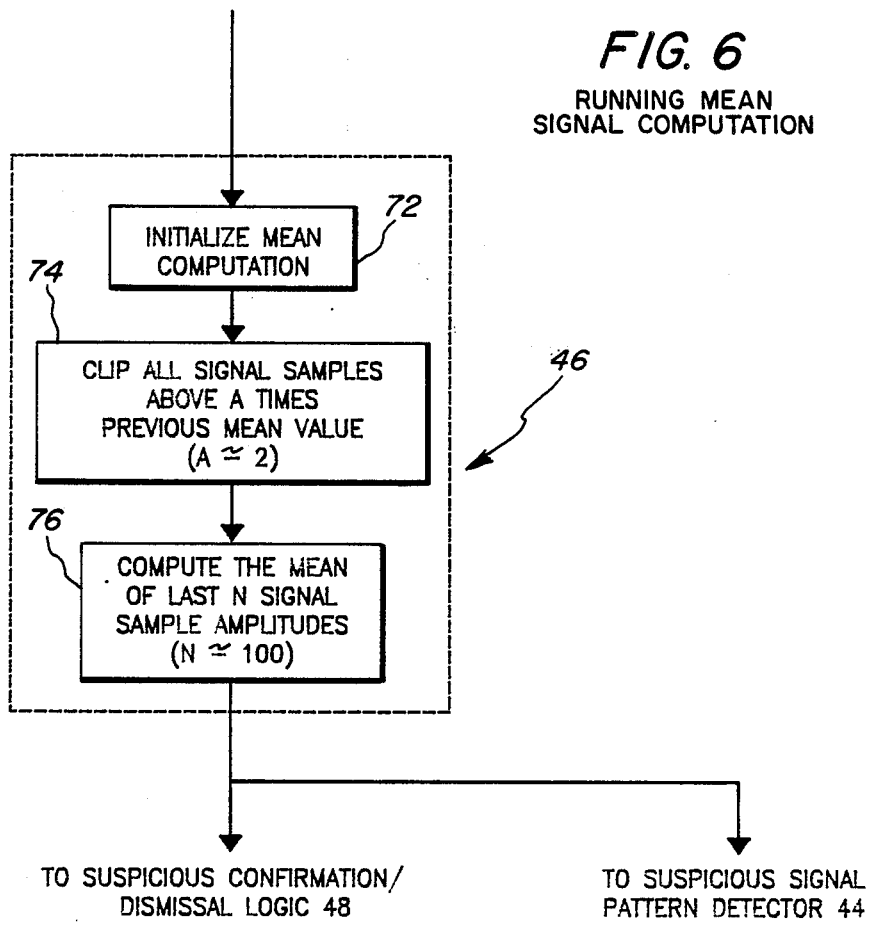

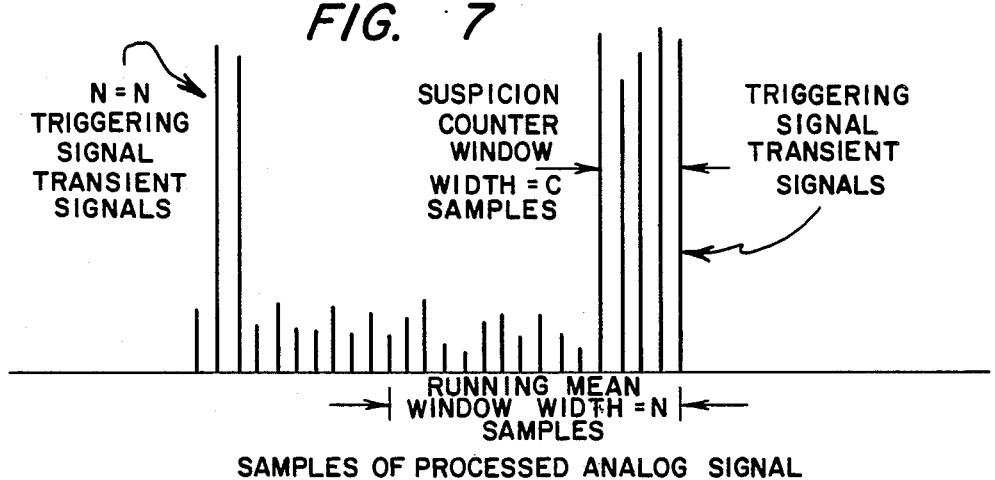
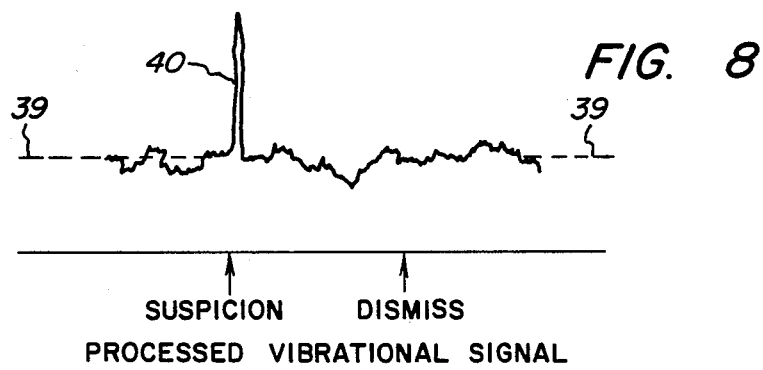
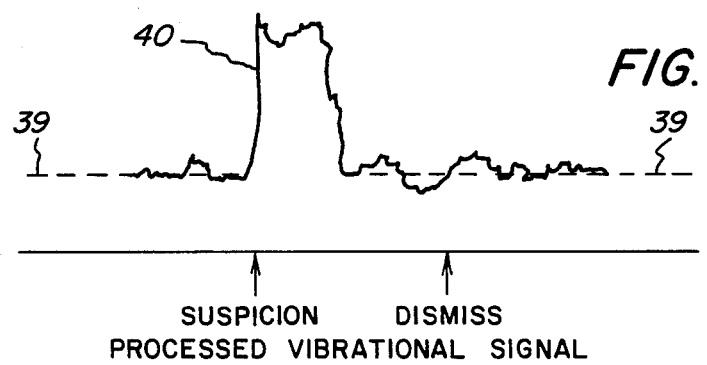

SUSPICION  CONFIRM

PROCESSED VIBRATION SIGNAL

SUSPICION  CONFIRM

PROCESSED VIBRATION SIGNAL

GROOVE CUTTING TOOL BREAK EVENT DETECTING METHOD AND SYSTEM

RELATED APPLICATION

Commonly assigned U.S. Pat. No. 4,707,687 is related to the present application.

BACKGROUND OF THE INVENTION

This invention relates to a system and method for acoustically detecting cutting tool breakage and rejecting background noise spikes that could cause false alarms, and more particularly, for acoustically detecting breakage of carbide groove tools used in cutting grooves during lathing operations.

A Machine Tool Monitor to detect broken tools and for part probing is described in commonly assigned U.S. Pat. Nos. 4,636,779, 4,636,780 and 4,707,687 and in published technical papers. A single sensor such as an accelerometer is mounted on the machine tool in a location with good coupling to vibrations generated at the tool-workpiece interface. The system is programmed to recognize signal patterns resulting from tool breakage. These patterns are typically abrupt, substantial increases or decreases in the cutting noise mean signal level that persist for a given confirmation period and are caused by sudden changes in cutting conditions resulting from critical geometry changes in the cutting edge. Another pattern is a gradual decrease in the cutting noise signal level due to a series of small breaks or other gradually occurring breakage.

A lathe tool break detection system has been developed that consists of a high frequency accelerometer to convert metal-cutting operation vibrations to broadband electrical signals, analog signal processing circuitry to amplify a selected band of signal frequencies and detect the energy in that band, and digital time-domain pattern-recognition logic to detect tool break signatures and reject normal cutting operation artifacts in the processed vibration signal. Pattern recognition logic has been developed which detects tool break events occurring in ceramic materials, for instance, commonly assigned U.S. Pat. Nos. 4,636,779 and 4,636,780. This tool break detection system has been successfully used for the detection of tool breaks in metal-cutting lathe operations in which the tools are various ceramic materials of round shape, and the workpiece materials are tough aerospace alloys such as Inconel. Tests with carbide tools cutting Inconel and other metals have shown the high frequency acoustic signal produced by a tool break event is often a dense high amplitude spiky noise.

It has been found, however, that the acoustical patterns recognized in ceramic and carbide cutting tool breaks are different from those of groove tool breaks, even if the groove tool is made from carbide. Thus, the logic used in the pattern recognition of the described ceramic tool break events is not suited for the detection of carbide groove tool breaks, and when used for this application, it produces frequent false alarms and even fails to detect some tool break events. This unsatisfactory performance is readily explained by the characteristics of both groove tool break signatures and groove tool normal cutting vibration signals, which differ materially from the corresponding signatures and signals when round ceramic tools or non-groove cutting carbide tools are used. Hence, there is a need for identifying combinations of signal properties which can be used to separate groove tool break signatures from normal groove tool cutting vibration signals, and to devise pattern recognition logic which can perform this function reliably.

A different set of characteristics apply to groove cutting or cutoff operations. The nature of grooving and cutoff operations results in the use of an insert that is inherently weak. Obviously, it must be no wider than the groove it is to cut. Furthermore, since the insert is surrounded on three sides by the workpiece, it must be relieved top to bottom on at least two sides as well as front to back. Also, the insert generally does not have a great deal of support, because the toolholder itself must be narrow and relieved. Due to the delicate nature of the grooving and cutoff operation, turning rates of the lathe holding the workpiece must be slower and feed rates must be lighter than in other types of turning operations to avoid insert breakage.

Carbide groove tools are used extensively in the manufacture of aircraft engine parts. Because of their peculiar geometry and the slow cutting speeds at which they operate, the normal cutting vibration signals and tool break signatures produced in groove tool operations are both very different from their respective counterparts in most other machining operations. Consequently, vibration signal-based tool break detection techniques developed for other machining operations work poorly when applied without modification to groove tool operations. This invention exploits the normal cutting vibration signal and tool break signature characteristics of groove tool operations to produce a reliable groove tool break detector.

Normal groove tool cutting vibration signals, after analog signal processing, differ from corresponding round ceramic tool vibration signals in several major ways. The mean signal level tends to be less than one per cent of the normal ceramic tool signal mean level, a result that is due primarily to the much lower surface speed used in groove tool operations. This low mean signal level is, in turn, one of the primary reasons why the groove tool vibration signal has many more short noise spikes with far higher spike peak-to-mean signal level ratios. Such noise spikes are produced by chip dynamics and other normal metal-cutting phenomena in both cases. In the ceramic tool case they are obscured and often completely hidden by the high mean signal level, but in the groove tool case they are not. Groove tool vibration signals also tend to drop out abruptly, and essentially completely, shortly after the beginning of a cut. This is apparently related to the peculiar geometry of groove tools and the slots they are often used to cut in workpieces.

The fracture of tools made of carbide or other metal materials generates vibrational energy signals having short, high amplitude spikes. In ceramic tool operations, however, these tool break acoustic emission spikes are often obscured by the mean cutting noise. In groove tool operations, the tool break spikes are readily seen because their amplitudes are many times the low background mean cutting noise. The effect of a ceramic tool fracture on the cutting vibration signal mean level is most often an abrupt and sustained mean level decrease, but several other tool break signature types can occur. The abrupt and sustained mean level drop is even more dominant in groove tool break events. Because of the particular characteristics of the acoustical pattern generated by groove tool break events, a method and sys-

SUMMARY OF THE INVENTION

Accordingly, one object of the present invention is to provide a system and method for reliably detecting broken tools in one type of tool break signature/background noise situation that tends to be associated with carbide groove tools cutting various alloys.

Another object of the present invention is to provide a reliable detector for lathe tool breaks when the tool in use is a special tool for cutting grooves and slots.

Still another object of the present invention is to provide a pattern-recognition method and system which readily and reliably detects and recognizes vibrational patterns having a very high amplitude, short duration, positive spike and a detectably lower mean signal level following the spike as compared to immediately preceding the spike.

A further object is to integrate a groove tool break event detector in a system which incorporates other detection systems such as an acoustic touch detector.

A still further object is to provide a groove tool break detector that is less subject to false alarms than existing tool detectors presently used with groove tools.

Another object of the invention is to provide a logic program which can reliably differentiate between groove tool break signatures and artifacts in normal cutting groove tool vibration signals so as to produce a sensitive detector of groove tool breaks with a low false alarm rate.

Still another object of the invention is to provide an improved break event detection method and system which is modified to take into account the known specifications of groove tools and also the specific types of break signatures associated with groove tools.

Yet another object and a distinct advantage of the present invention is to provide a reliable method and system for the detection and recognition of a vibrational pattern associated with the tool break signature/background noise form of groove cutting tools while avoiding false alarms caused by incorrect interpretation of normal cutting groove tool vibration signals.

Yet another advantage of the invention is the extraction of groove tool break detection clues from both the acoustic emission energy produced by the break event itself, and from changes in the background cutting noise caused by changed grooving conditions after the break event.

A significant feature of the present invention is the logic program which allows the system to avoid mistaking the dense, high-amplitude, short duration noise spikes encountered in the normal groove tool cutting vibration signal for the abnormal cutting signal generated immediately after the break event occurs, while detecting the true groove tool break signatures in spite of the confusion of the noise spikes.

Another significant feature of the present invention is the use of a two-level logic scheme which first detects suspicious signal artifacts that meet the required criteria encountered in grooving operations, and then subjects the acoustic emission energy signal to further tests as a result of the triggering event caused by the suspicious signal. The further tests will either lead to a detection of the abnormal cutting signal generated after a groove tool break event, in which case a tool break alarm is generated, or to a detection of a normal cutting vibration signal, in which case the system will revert to the first level step of looking for further suspicious signal artifacts.

In accordance with these and other objects, advantages and features of the present invention, there is provided a machine tool monitor, a system and a method for detecting groove cutting tool break events including the sensing of a vibrational energy signal by a broadband vibration sensor, converting it into an electrical signal, converting the analog electrical signal into digital form by an analog/digital converter, filtering unwanted low-level noise out of the signal, and digital circuitry for processing the digital signal whereby the monitor and system operates in such a way as to detect a consecutive set of transients having specified characteristics, which detection shifts the operation of the digital circuit to a second level comparison of the running mean signal level before and after the consecutive series of transients has been detected, and if a predetermined level drop has been detected, to trigger a groove tool break alarm.

A system is disclosed and claimed in which a broadband vibration sensor, such as an accelerometer which is most sensitive to frequencies around a resonant frequency, typically 30 KHz and above, is positioned on the machine tool to sense vibrations at the groove tool-workpiece interface during the machining process. An analog preprocessor has a highpass filter to attenuate low frequency machining noise, and a full wave energy detector to rectify and low-pass filter the signal. The 500 Hz or less cutoff frequency of the low-pass filter prevents aliasing from the subsequent sampling operation. The unipolar output signal of the analog preprocessor is sampled, and the samples converted to digital form and then analyzed by digital circuitry, which may be a programmable general purpose computer. The tool break detection logic alarms on major tool break events capable of damaging the workpiece, and prevents false alarms on minor tool break events that can be ignored and on transient spikes and spurious noise from other sources.

The digital circuitry has provision for calculating the running mean signal level of a selected number of signal samples. A transient detector compares every new sample with the running mean signal value of N previous samples to detect a transient or abrupt increase in signal level that may have its source in a major tool break event. If a suspicious transient signal counter has counted at least a predetermined number of consecutive transient signals, the logic circuit then directs the program into the second level where the groove tool break event is either confirmed or dismissed.

In this part of the logic circuit, a mean shift detector compares the mean signal level after and before such a consecutive series of transient signals in order to detect a shift in mean level and thus a substantial change in background cutting noise. A mean shift persistence detector makes a check that the shift in mean level persists for a given period. A tool break alarm is generated only after confirmation of a major or significant tool break event meeting these tests. In practicing the method, detection of a consecutive series of transient signals not followed by a shift in background noise level results in dismissal and return to the transient detect phase, and failure to meet the persistence check causes dismissal and return to transient detect. A tool break alarm is generated only when all the criteria are satisfied.

BRIEF DESCRIPTION OF THE DRAWINGS

FIGS. 4-6 are block diagrams of detailed portions of the block diagram of FIG. 3.

FIG. 7 shows the sampled signal, the "running mean" window and the suspicion counter window.

FIGS. 8-11 illustrate several processed analog vibration signals; the first two represent minor tool break events or spurious noise and do not result in an alarm, and the second two contain major groove tool break event signatures and trigger an alarm.

DETAILED DESCRIPTION OF THE INVENTION

Groove cutting inserts of metal-cutting lathes break under a variety of different machining conditions and these tool break events produce a variety of different vibration signal signatures. Some of the machining conditions that affect the nature of the tool break vibration signature and spurious noise characteristics are the type and precise composition of the insert material, the shape of the insert and other geometry factors, methods of mounting the insert in the tool holder including material and geometry of the groove tool seat and use of a chip breaker; chatter; depth of cut, feed rate and spindle speed; roughness of the workpiece surface, including surface scale and previously machined holes; workpiece material; and cut discontinuities at the inside and outside corners. The machine tool monitor according to the present invention, analyzes the vibration signal and separates those signal signatures caused by significant groove tool break events from those caused by either spurious noise sources or insignificant tool break events.

In general, a groove tool break event produces a vibration signature with two parts, an acoustic emission in the form of one or more short spikes caused by the sudden cracking of the insert material, and a change in the cutting noise signal due to a change in the cutting conditions caused by the broken insert cutting differently from the unbroken insert. A description and analysis of the variety and types of tool breaks are fully explained in commonly assigned U.S. Pat. No. 4,636,779, issued to the inventor herein, the subject matter of which is hereby incorporated by reference.

Figure 1:
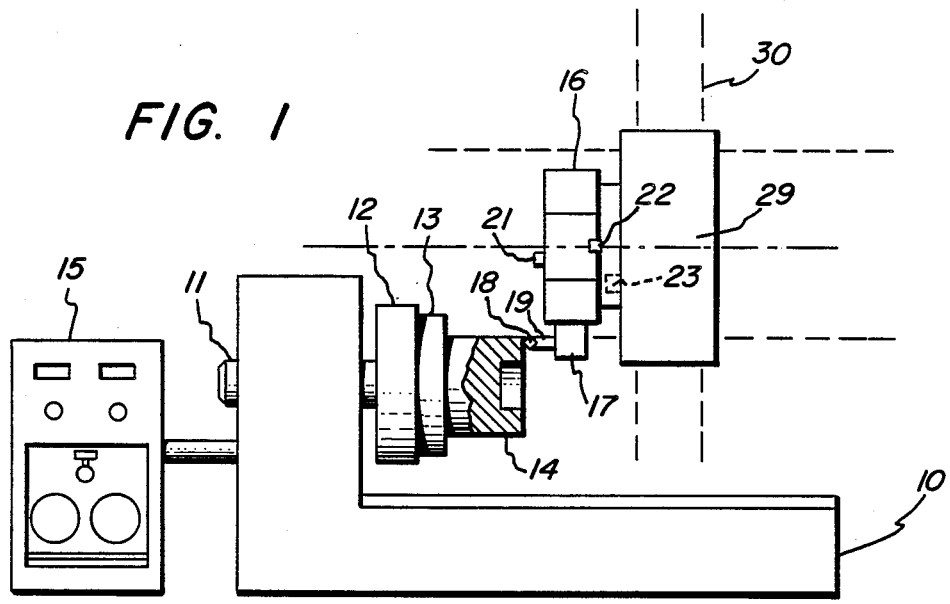
FIG. 1 is a partial elevational view of a horizontal turret lathe during a grooving operation showing alternative positions of the accelerometer.

FIG. 1 is a simplified drawing of a horizontal turret lathe which will be utilized to describe the invention, but it should be noted that the monitor of the present invention has applicability to other types of machine tools such as, for example, vertical turret lathes, milling machines, machining centers, and drills. The portion of the horizontal turret lathe illustrated has a machine frame 10, spindle shaft 11, chuck 12, fixture 13 for holding the workpiece 14, and an NC control station 15. A rotatable tool turret 16 has several tool posts 17 to support the tool holders 19 and groove cutting inserts 18, sometimes referred to herein as groove tools 18, or groove cutting tools 18.

The turret 16 is supported on a turret mount 29 which in turn has movement along the two cross slides 30. A vibration sensor 21 such as a broadband accelerometer is mounted on turret 16; thus a single sensor in a single mounting position can monitor any tool holder position the operator selects for the cutting operation. This mounting location provides a satisfactory signal-to-spurious-noise ratio even for grooving operations. Since the turret 16 can be rotated, and in many machines, only in one direction, the sensor cannot be electrically connected to stationary signal processing electronics through simple cables. A rotating electrical coupler 22 is one way of transferring the electrical signal outputted by the transducer. Optionally, another vibration sensor 23 is mounted on the cross slide 30 where no rotating coupler is required and tests have shown that good operation is obtained on some lathes.

Figure 2:
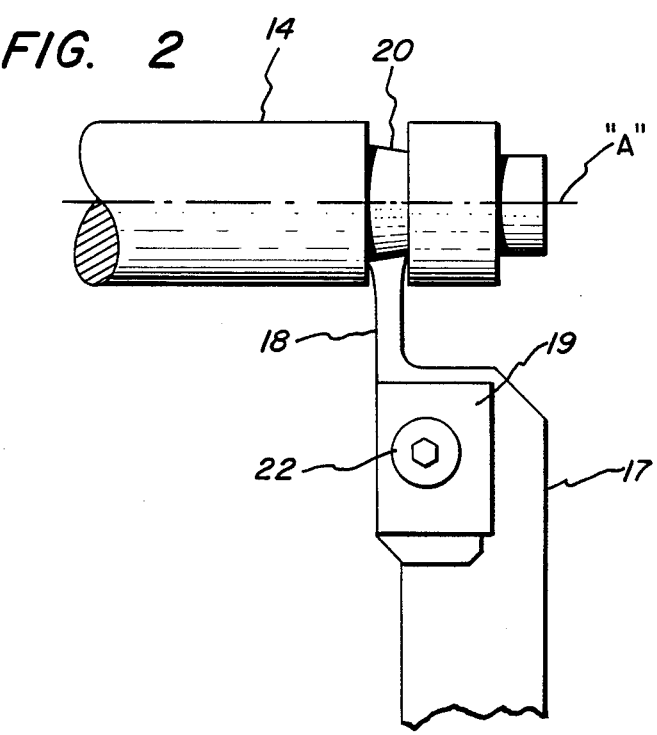
FIG. 2 is a close-up view of groove tool showing the grooving operation.

FIG. 2 illustrates in detail a groove cutting insert or groove cutting tool 18 for cutting a groove 20 in workpiece 14 in a lathing operation where the groove cutting tool performs the cut from the side of the workpiece 14, rather than the end as is shown in FIG. 1. Workpiece 14 rotates on a lathe around rotation axis "A". For the start of the grooving operation, tool post 17, holding the groove cutting insert 18 in tool holder 19 by means of a set screw 22 or other holding means, is brought toward workpiece 14 so as to bring groove cutting insert 18 into contact with the workpiece 14.

The terms "groove cutting tool" and "groove cutting insert" are used generally in somewhat different ways by different manufacturers and users. It is herein defined to cover lathe tools used in operations that may be designated as "grooving", "slotting", or "cutoff". The common feature is that the shape of the groove cutting tool 18 and the conditions under which it must operate make it inherently weak and subject to abrupt fracture due to machining forces, relative to tools used in other turning operations. Within this class of tools, many different tool shapes are encountered as tool shapes are selected to meet the special needs of the operation to be performed. The parameters of the logic circuit may be set in order to anticipate modifications in shape of the tool 18, tool holder 19 and tool posts or supports 17, as will be discussed below.

The particular groove break detector approach according to the present invention detects acoustic vibrations in the 30 to 100 KHz region and uses pattern recognition techniques to distinguish from the background noise the effects of tool break events. It makes use of both acoustic emissions produced by the rupture of the groove tool insert material, and changes in the cutting noise background that have their origin in changed cutting conditions resulting from the tool break event. Most other acoustic tool break detectors operate above 100 KHz and concentrate on detecting the acoustic emission from the tool break event itself. Tests have shown that this acoustic emission signal is not always detectable because of the masking effects of the background noise in aggressive, high productivity machining, and that it is not generally desirable to stop the cutting process on detection of an acoustic emission not followed by a substantial change in cutting noise.

Moreover, because of the delicate nature and stresses created in the machining of grooves, groove cutting with groove tools usually made of carbide, is not very aggressive, and requires lathing at slow rotation speeds as well as slow feed rates and small depths of cut. This results in low normal cutting vibration signal levels and numerous high density, short duration spikes encountered in these types of groove cutting operations.

Figure 3:
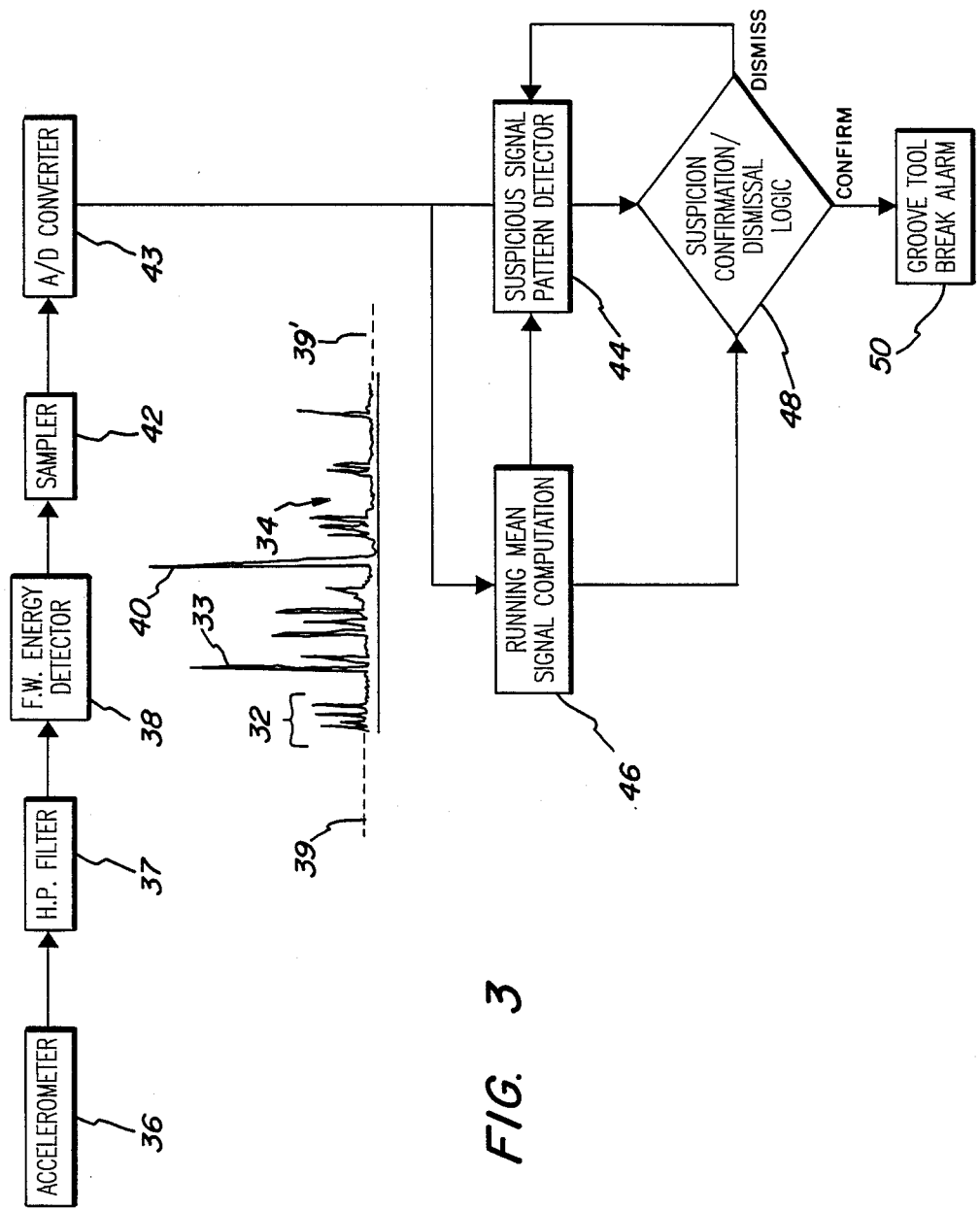
FIG. 3 is a block diagram of the groove tool break detection logic and system and shows a unipolar vibration signal of a groove tool break event which results in a tool break alarm.

Attempts at utilizing known tool break event detection methods and systems, such as that described in aforementioned U.S. Pat. No. 4,636,779, which use devices suited for detecting other types of tool break events, such as ceramic tool breaks, have manifested the need for a different system for detecting breaks in carbide tools ad carbide groove tools in particular. Systems designed for detecting breaks in ceramic tools perform poorly (or unsuccessfully) with respect to carbide groove cutting tools. The principal reason for poor performance of the ceramic tool break detection system when employed to attempt to detect groove tool breaks lies in the inability of the ceramic cutting tool break event detection devices to distinguish between the dense high amplitude, short duration spikes 32 of the normal cutting vibration signal and of the abnormal cutting signal 34 immediately after the break occurs, as shown in FIGS. 3 and 12.

The tool break detection system for carbide groove cutting tools must avoid mistaking noise spikes, such as spikes 33, for a tool break signature, and must also avoid dismissing any true tool break signatures, such as spike 40, because of the confusion generated by the noise spikes 32, 33 or because of inability to see a tool break signature that occurs while a prior noise spike 33 is being examined for break signature-like properties. A secondary reason for the poor performance of the ceramic tool break detection system in its application to carbide groove cutting tools is confusion between true tool break signatures and signal drop outs 35. Therefore, the groove tool break detection system must prevent false alarms on such signal drop outs.

Figure 12:
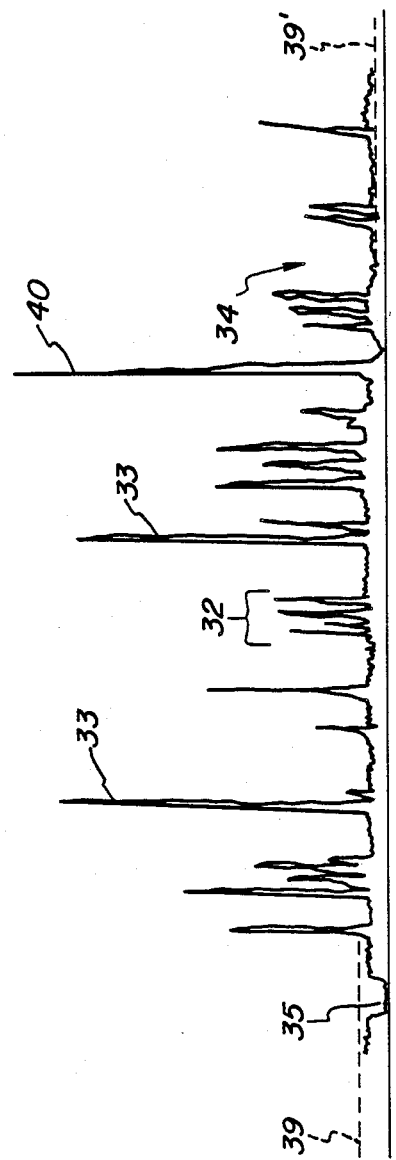
FIG. 12 shows a representation of an analog signal of a groove tool machining process with a major break event.

Continuing to refer to FIG. 12, the carbide groove tool break signature differs from the ceramic tool break signature in two important ways. First, the groove tool break signature always begins with a very high amplitude, short duration spike 40 that is easily detected on its rising edge. The mean signal level 39' after the spike is detectably lower than the mean signal level 39 just before the spike 40. In contradistinction, a ceramic break signature usually begins with an abrupt drop of the mean signal level without a detectable positive-going spike.

Figure 10:
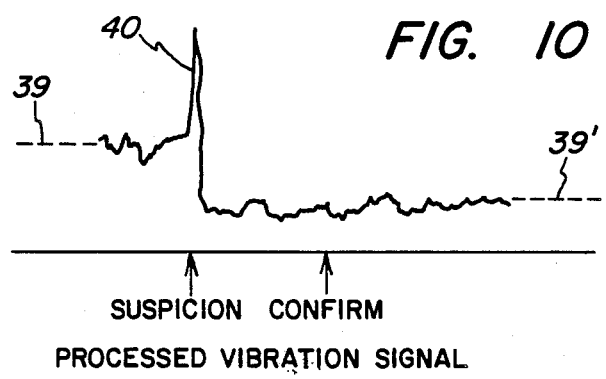
Figure 11:
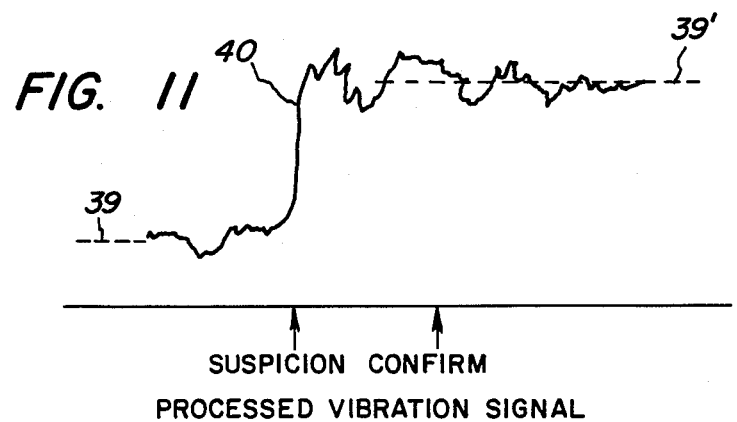
Figure 13:
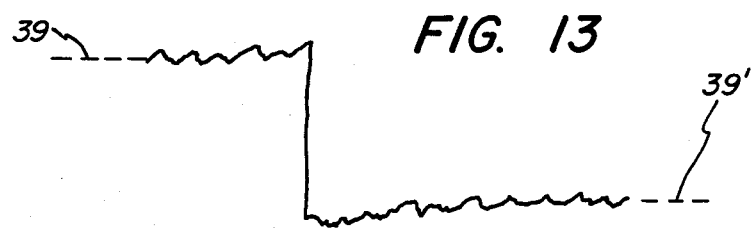
FIG. 13 illustrates a processed analog vibration signal of a ceramic tool break event having a downward going slope not seen in groove tool breaks.

Tool break signature types such as that shown in FIG. 13 occur frequently with ceramic tools and must be detectable by any successful ceramic tool break detector. In this type of tool break signature, the signal level drops abruptly from level 39 to level 39', and there is no prior large positive-going signal spike, such as spike 40 shown in FIG. 12. However, in carbide groove tool break events, the type of tool break signature shown in FIG. 13 has not been seen; the tool break signature types of FIGS. 10 and 11 are dominant. The groove tool break detection system makes use of the reliable presence of an abrupt, large positive-going signal transient 40 in the groove tool break signatures to discriminate against false alarms from signal drop outs 35 shown in FIG. 12.

The carbide groove cutting tool operating conditions differ from ceramic tool operating conditions in ways that affect the tool break detection problem directly, as well as indirectly through their effects on the vibration signals In particular, because the groove cutting tools are thin carbide instead of thick ceramic, they are operated at surface speeds much less than the usual ceramic tool cutting speeds. Since spindle RPM is also much lower, the period of a spindle revolution is much longer. Any portion of the tool break detection logic that is in any way related to this period will need to take much more signal time to reach a decision, and more time should be available before part damage becomes serious. This is because the motion of the tool relative to the part is slower. These considerations indicate that the groove cutting tool break detection system will need to observe and analyze longer samples of the vibration signal before making its tool break event/normal cutting signal artifact decision.

Both the ceramic tool break logic previously developed, and the groove cutting tool break detection logic herein disclosed, make use of a running signal mean computation. However, dense cluster of noise spikes 32 in the groove tool signals cause the local mean level to vary greatly, so that the mean level between spikes can only be determined by averaging the signal level over relatively long time periods. If a long averaging period is not employed, it is very easy to confuse changes in the local mean due to noise spike clusters with level changes that are caused by changes in cutting conditions associated with tool break events. Similarly, it is very easy for signal mean level changes due to tool breaks to be missed by the tool break detection logic because they are locally counteracted by spike cluster effects. For these reasons, the groove tool break detection logic uses a long averaging period for its tracking mean computation. As an example, and assuming a 2000 sample per second sample rate, an averaging period in the range of one hundred samples is required in the computation of the Running Mean, as shown in box 76 of the block diagram illustrated in FIG. 6.

The main features of the tool break detection system are indicated in FIG. 3. The sensor is a broadband accelerometer 36 with a flat response from very low frequencies to just below its resonant frequency in the vicinity of 30 kHz and above. This resonance is lightly damped, so the sensor is most sensitive to frequencies within a few kilohertz of its resonance, and sensitivity falls rapidly for frequencies much above the resonant frequency. One such high frequency vibration sensor is the Vibrametrics VM1018 accelerometer (Vibra-Metrics, Inc., Hamden, Conn.). The vibration signal is high-pass filtered in a filter 37 with a cutoff frequency slightly below the resonant frequency of the sensor to attenuate high amplitude machinery noise, which tends to be concentrated at lower frequencies. The combination of the resonant accelerometer and the high-pass filter produces a bandpass filtering of the vibration signals that favors frequencies in about a 20 kHz band in the vicinity of the accelerometer resonance frequency.

A full wave rectifier and low-pass filter combination acts as a full wave energy detector 38 (the filtering is too heavy for true envelope detection), converting the bipolar sensor signal to a unipolar "envelope" signal The cutoff frequency of the low-pass filter provides anti-aliasing filtering and is typically 500 Hz or less to prevent aliasing from the subsequent sampling operation as long as the sampling frequency is well above the 1 kHz Nyquist frequency. Thus, the sampling period can be long enough to accomplish the necessary digital analysis of the signal between analog signal samples. The cutoff frequency of the low-pass filter in fact may be as low as 100 Hz. One type of filtered unipolar signal at the output of the analog preprocessor, which is or which contains a major groove cutting tool break event vibration signature, is shown in FIG. 3 and in more detail in FIG. 12. The background cutting noise signal prior to the tool break event is indicated at 39. A short positive-going signal transient 40 well above the previous background noise level may be the vibrational emission from the cracking groove cutting tool insert or it may be due to a momentary jamming of a broken piece of insert against the workpiece. This is followed at 39' by a sustained drop in the background cutting noise level usually due to a substantial reduction in depth of cut after part of the groove cutting tool insert breaks away.

The signal samples of the output of the analog signal processing, extracted by sampler 42, are next converted to digital form by the analog-to-digital converter 43 and are further processed and analyzed by digital circuitry 44, 46, 48, 50 which may be in the form of a programmable general purpose computer.

Both the ceramic tool break detection logic disclosed in aforementioned U.S. Pat. No. 4,636,779 and the groove cutting tool break detection logic herein disclosed, make use of a two-level logic scheme that detects suspicious signal artifacts that meet certain criteria, as shown in box 44, and then subjects each "suspicion" to further tests as additional signal information is accumulated, as in box 48. If the further tests 48 are passed, a tool break alarm 50 is generated. If they are failed, i.e. dismissed, the logic reverts to looking for further suspicious signal artifacts 44.

In order to retain the cost of the digital circuitry means in a reasonable range, and within the expense limitations of low-cost microprocessors, the logic is allowed to be blind to new suspicious artifacts while it is busy checking out a "suspicion" in the suspicion confirmation/dismissal mode 48.

When the noise spike density is high, as it is with groove cutting tool operations, there is a danger that the logic program will spend most of its time checking out noise spikes, and therefore have a high probability of missing a tool break because it occurs when the program is blind to new suspicious artifacts. For this reason, the groove cutting tool break detection system applies more stringent tests than the ceramic tool break detection system to signal artifacts before accepting one for further testing. This is done in three ways. First, only positive-going signal transients are accepted, and second, they must have higher peak-to-mean signal ratios, e.g. a ratio of about eight, and at least four, has been found acceptable, as is shown in box 52 of the block diagram illustrated in FIG. 4.

Third, the signal transient must remain above a threshold reflection this ratio for several and at least three signal sample periods, as is shown in the suspicion counter block diagrams of boxes 51-57 and the window width C in FIG. 7, not just one, as is the case in aforementioned U.S. Pat. No. 4,536,779.

Numerical values for these artifact-checking parameters are selected so that all groove cutting tool break acoustic emission spikes meet the criteria, but most normal cutting noise spikes do not. Moreover, these parameters may be set for a variety of different groove tools, holders, workpiece materials as the individual case requires.

Testing of sample vibrational energy emission data has shown that approximately eight for the signal sample/running mean ratio, and about five for the number of consecutive signal samples above the ratio in a series are acceptable parameters for most grooving operations using a 500 millisecond signal sampling period. These parameters are incorporated into the logic program as is shown by block 52 of FIG. 4.

Figure 4:
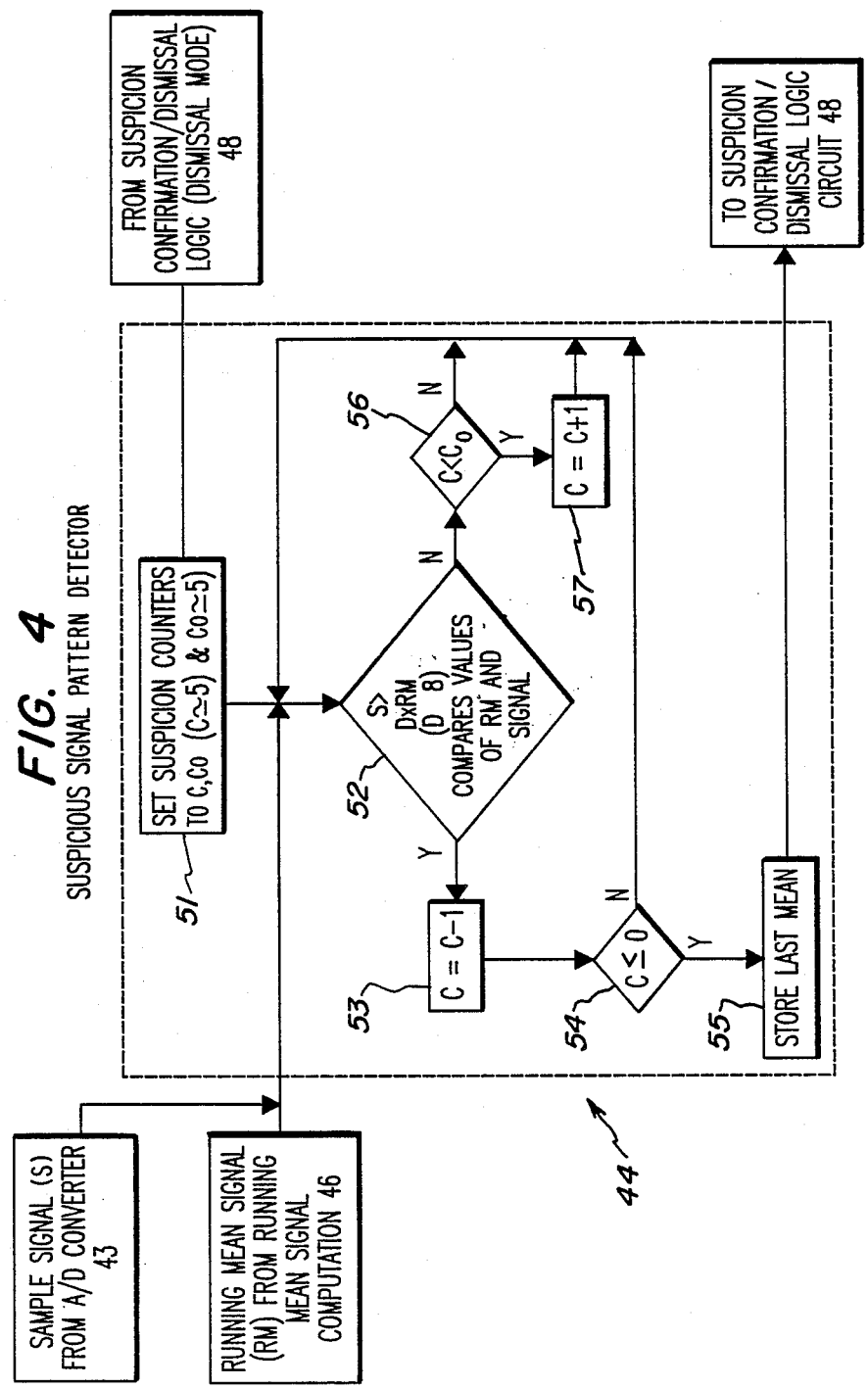

The logic program contains a suspicious signal pattern detector 44 as is shown in FIG. 4. Initial values of suspicion counters C and Co are set, block 51, at appropriate values, e.g. five for each of C and Co. Mean signal levels are continuously accepted from the running mean signal computation logic 46, which has received a sample signal level S from the A/D converter 43 and computed a running mean signal of the last N signal levels, block 76 of FIG. 6. This Running Mean signal is provided to the detector logic 44, and computes a large number of signal samples N, approximately 100, as noted above. The logic also receives the sample signal S from the A/D converter 43 and proceeds to compare the sample signal S with an appropriate multiple D of the running mean signal RM shown in block 52. D may be set at approximately eight and would depend on the parameters desired from a study of the particular machine conditions utilized.

It should be noted that this part of the logic circuit looks for a consecutive series of signal samples up to C, which may be set at five, that have amplitudes at least equal to D times RM. Thus, those signal samples S which meet the decision criterion of block 52 decrement the counter C by one at block 54. The logic program then checks whether the requisite number C samples have been counted, at block 54, by determining whether the counter C has been decremented to zero. Thus, if C samples have consecutively met the criterion of block 52, the logic program stores the last Running Mean received from the computation 46, as shown in block 55, and proceeds to the suspicion Confirmation/Dismissal logic portion of the program 48, shown in detail in FIG. 5.

If the signal sample S fails to meet the criterion of block 52, the logic program proceeds to block 56, where C is compared to the constant value Co set in block 51. If C is less than Co, the logic program increments C, block 57. If C is not less than Co, the program proceeds to process another sample S and Running Mean signal RM. This branch of the detector logic 44 tends to compensate for spurious readings in the system by allowing a non-sequential series of signal samples to be counted as long as the number of signal samples meeting the D times RM amplitude criterion exceeds, by the requisite number C, the number of samples failing to meet this criterion.

It should be noted that the measures taken to reduce the frequency of suspicions are permissible only because the groove tool break signature (unlike a ceramic tool break signature) always begins with a high-amplitude positive-going signal transient. It should also be noted that these measures eliminate the signal drop out false alarms, shown at 35 in FIG. 12, because the signal drops not preceded by positive-going signal transients are ignored by the circuitry. In combination with the long mean averaging time, these measures greatly reduce the probability of a noise spike "suspicion" being wrongly confirmed on an apparent mean level drop really due to the effects of noise spike clusters on the reference mean signal. To provide the long mean averaging time, Running Mean Signal Computation 46 of FIG. 6 computes a greater number of signal samples, approximately one hundred samples as shown in block diagram element 76, rather than sixteen samples as is disclosed by U.S. Pat. No. 4,636,779.

Figure 5:
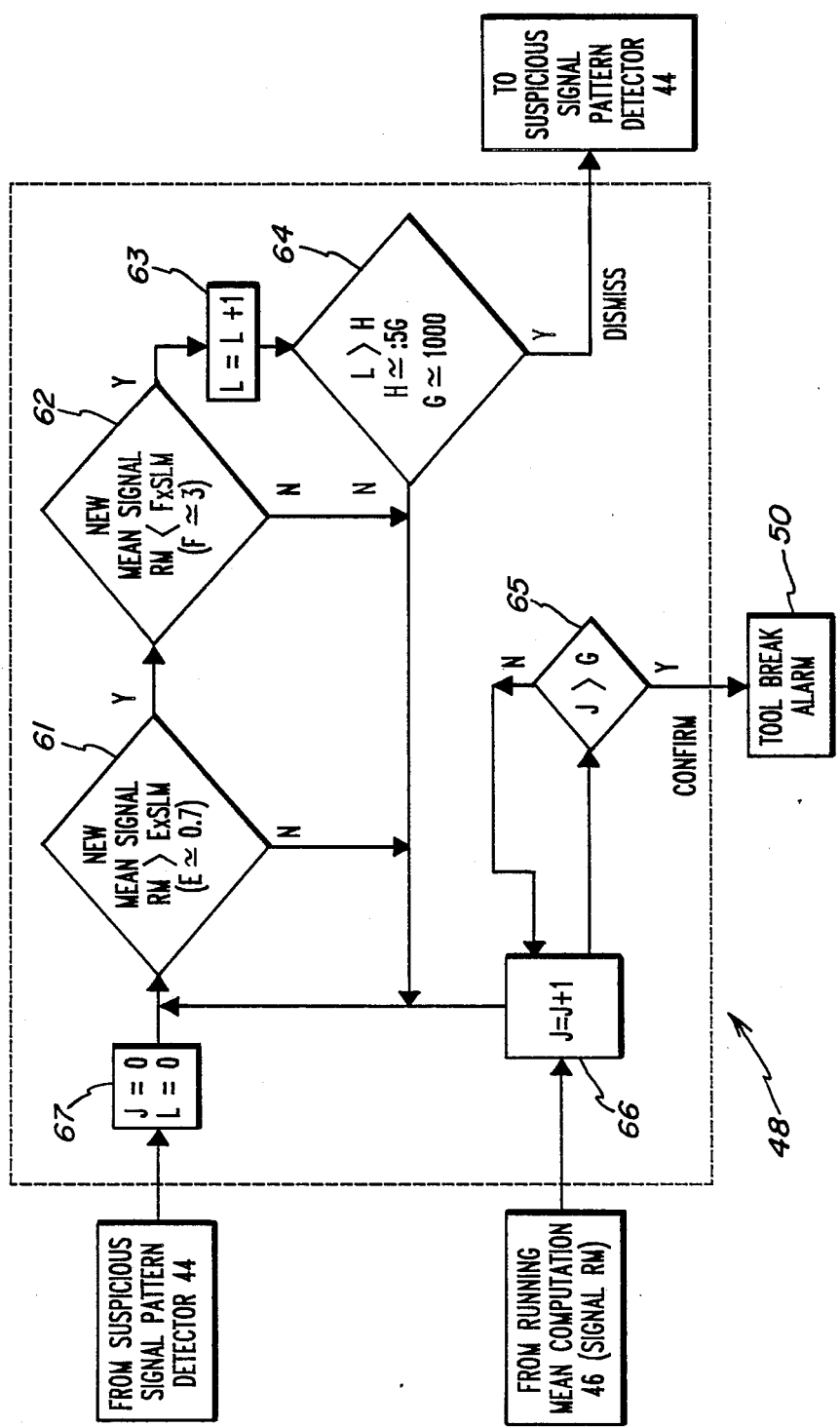

To further improve the "suspicion" confirmation logic shown in FIG. 5, the groove cutting tool break system makes three additional changes from the ceramic cutting tool logic system disclosed in aforementioned U.S. Pat. No. 4,636,779. The first change biases the mean level shift test to make it more sensitive to level drops and less sensitive to level increases as will be shown in the discussion of blocks 61 and 62 of FIG. 5 below. Groove cutting is usually not very aggressive, and so the decrease in depth of cut due to a tool break may not reduce the mean signal level as much as it does in ceramic tool operations. On the other hand, an increase in mean signal level after a tool break, if it occurs due to trapping of the broken tool fragment, is likely to be considerable because of the geometries involved in groove cutting tool operations. The danger of false mean level increases from noise spike clusters makes it desirable to avoid alarms on small increases. As illustrated in FIG. 11, only a substantial increase in the running mean signal level accompanying a groove cutting tool break will trigger the confirm mode and lead to a tool break alarm, but a much smaller decrease in the running mean signal level will do so.

The second change of the present invention as compared to the ceramic cutting tool logic system is the clipping, of signal samples before they are used to update the running mean computation. First the mean computation is initialized as shown at 72, FIG. 6. Clipping is performed continuously and at all times in the processing of the system logic, as is shown in block 74 of FIG. 6. In the ceramic cutting tool break detection logic, this feature is suspended when a "suspicion" is detected and is reinstated when the "suspicion" is dismissed. This change reduces the effects on the computed mean of noise spike clusters occurring during the "suspicion" confirmation period, and is illustrated at FIG. 6, block diagram element 74. The change is made necessary by the tendency for such post-tool break noise spike clusters to be more prominent in groove tool break signatures.

The third change also addresses the problem of post-break noise spike clusters that locally raise the computed mean level. It involves using a longer confirmation period and accepting as a mean level shift cases where the shift is detectable as little as 50% of the confirmation period, rather than the 99% required in the ceramic cutting tool break detection logic. Thus, parameter H of FIG. 5, the maximum number of running means without detectable shift, is set approximately half the value of G, the total number of running means in the confirmation/dismissal window, as is shown in block diagram element 64.

FIG. 12 shows in greater detail the clues used to detect and recognize groove cutting tool break signatures and reject other signal artifacts. Element 40 indicates a groove cutting tool acoustic emission spike which triggers the logic system suspicious signal pattern detector 44 of FIG. 3, shown in greater detail in FIG. 4. As the system logic of FIG. 4 directs, only a series of five signal samples, corresponding to a total real-time period of about 2.5 milliseconds, and having a signal level greater than eight times the running mean signal level 39 will trigger the logic to progress to the suspicion confirmation/dismissal logic circuit indicated at 48 of FIG. 3, and shown in greater detail at FIG. 5.

If a shift in the running mean, such as the one indicated at 39' of FIG. 12, is confirmed by the system logic of FIG. 5, a tool break alarm 50 is sounded. The logic shown in FIG. 5 operates to either confirm or dismiss the suspicious signal pattern detected by the logic illustrated in FIG. 4. The logic circuit of FIG. 5 is first triggered and operates only if the suspicious signal pattern has been detected. Counters J and L are initially at zero (block 67). It first accepts as input the last running mean as stored by block 55 of FIG. 4, and also accepts the running mean of the last one hundred signal samples from block 76 of FIG. 6. The L counter circuit 63 then counts a new mean, only if the new mean signal is between certain parameters established by blocks 61 and 62. Specifically, the new signal mean is required to be between E times the stored last running mean (SLM) and F times the stored last running mean, as required by decision blocks 61 and 62. If the new mean signal is not between these parameters, the L counter circuit 63 does not count the mean signal in its mean signal count computation, but continues the processing of new mean signals as they are received from the Running Mean Computation. As noted above, these parameters tend to bias the mean shift test toward accepting small level decreases, while requiring large level increases for break alarms.

Another portion of the logic circuit 64 compares the number of new mean signal counts L which fall within the range to a certain predetermined number H, previously set. If the number of new mean signals counted within the range exceeds H, before the total number of mean signal counts J reaches a predetermined number G, the logic program dismisses the suspicion signal detected and reverts to the suspicious signal pattern detection logic 44. However, see block 65, if the number of total mean signal counts J reach G before H new mean signals falling within the range have been counted, the tool alarm 50 is sounded. For purposes of groove cutting tool break detection and recognition, the number of new mean signals counted, G, has been determined to be optimum at approximately one thousand, and the required number to fall outside the predetermined range H is approximately half of G, or around five hundred In other words, the logic circuit is set to run up to one thousand new mean signals, unless at least five hundred have been found to be within the required parameters. If one thousand new mean signals have been run and new mean signals within the range L have not reached the required five hundred, a tool break alarm sounds. If the number L does reach five hundred, the logic dismisses the suspicious signal pattern as spurious, and the logic circuit reverts to looking for new suspicious signal patterns 44 as shown in FIG. 4.

It is understood that the parameters and number of counts described above are approximate and the logic program of future developments in sampling rate may provide for the ability to change both the parameters and the count numbers so as to give the program the flexibility to work with a variety of different groove cutting tool configurations and other machining conditions. Further testing of the program for individual types of groove tools would provide the optimum parameter and count number values for each type of groove cutting tool, and these values could be standardized within the industry. However, it should be noted that at least a certain large number J of new mean signals needs to be counted for groove tools so as to permit recognition of level drops in spite of the spurious noise spikes generated in groove tool operations.

While the invention has been particularly shown and described with reference to preferred embodiments thereof, it will be understood by those skilled in the art that various changes in form and details may be made without departing from the true spirit and full scope of the invention.

What is claimed is:

1. A system for detecting cutting tool break events while machining a groove in a workpiece comprising:
   (a) means positioned on a machine tool for sensing vibrations generated at the interface of a carbide groove tool and workpiece and converting said vibrations to an electrical analog signal;
   (b) processing means for filtering said analog signal to discriminate against low frequency machine noise, and to rectify and detect the energy of said signal in a band around a resonant frequency of the vibration sensing means and to provide a unipolar output signal;
   (c) means for sampling said unipolar output signal and converting each sample to digital form;
   (d) digital means for detecting major groove tool break events capable of marring the workpiece in which a groove is being machined, including computation means for calculating a running mean signal level of a preselected number of previous signal samples, a suspicious signal pattern detector to detect a consecutive series of several signal samples having an increase in signal level that is a predetermined multiple above the running mean signal level and may have its source in a major groove tool break event, and a suspicion configuration/dismissal logic circuit to compare the running mean signal level before and after detection of a suspicious signal pattern and confirm the suspicion when there is a shift in the running mean signal level that exceeds prechosen limits and persists for longer than a predetermined confirmation period, and otherwise dismissing the suspicion; and
   (e) means for generating a groove tool break alarm after confirming the suspicion;
wherein said shift in the running mean signal level to confirm the suspicion is biased to be more sensitive to level drops than to level increases.

2. A method of detecting breakage of a groove cutting tool operating on a workpiece comprising:
   (a) sensing vibrations at an interface between said groove cutting tool and workpiece during a machining operation and converting said vibrations to an electrical signal;
   (b) processing said electrical signal to discriminate against low frequency machining noise and detecting the processed signal to develop an output signal having noise spikes and a positive-going signal spike that has an amplitude higher than the typical noise spikes and may indicate major groove tool breakage;
   (c) sampling said output signal and converting every sample to a digital signal;
   (d) calculating the running mean signal level of N previous samples after first having a clipped those samples that are more than approximately two times higher than a last running mean signal level to reduce the effect on the calculated mean of a cluster of said noise spikes;
   (e) detecting said higher amplitude positive-going signal spike by comparing every sample with the running mean signal level and counting several samples that are a predetermined multiple higher than the running mean signal level, comparing the running mean signal level after and before detection of said positive-going signal spike to detect a substantial running mean signal level shift due to a decrease or increase in background cutting noise and checking that said running means signal level shift persists for a given confirmation period and dismissing any signal spike not meeting this second criterion; and
   (f) generating a groove tool break alarm when both criteria are satisfied;
wherein, to detect said higher amplitude positive-going signal spike, about three to five signal samples are counted having an amplitude at least four to about eight times higher than the running mean signal level; and
   wherein the shift in running mean signal level to confirm a groove tool break event is biased to be more sensitive to the decrease in signal level than to the increase in signal level.

* * * * *